3,407,649
METHOD AND APPARATUS FOR GENERATING
A HIGH POWER ULTRASONIC BURST PULSE
SIGNAL
Ben Wade Oakes Dickinson III, 3290 Jackson St.,
San Francisco, Calif. 94118
Filed Aug. 6, 1965, Ser. No. 477,906
16 Claims. (Cl. 73—67.5)

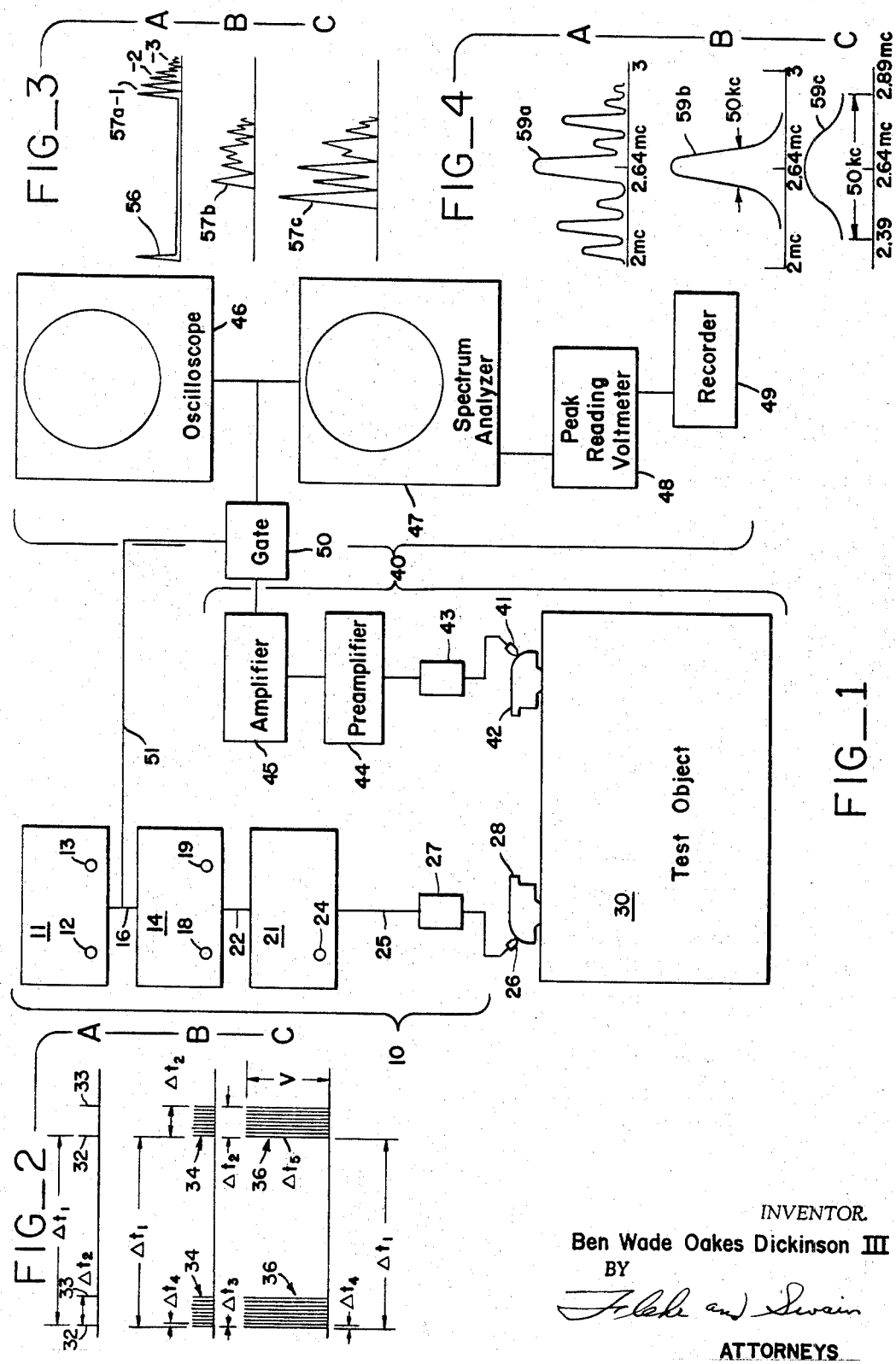
Oct. 29, 1968  B. W. O. DICKINSON III  3,407,649
METHOD AND APPARATUS FOR GENERATING A HIGH POWER
ULTRASONIC BURST PULSE SIGNAL
Filed Aug. 6, 1965  2 Sheets-Sheet 1
INVENTOR.
Ben Wade Oakes Dickinson III
BY
ATTORNEYS

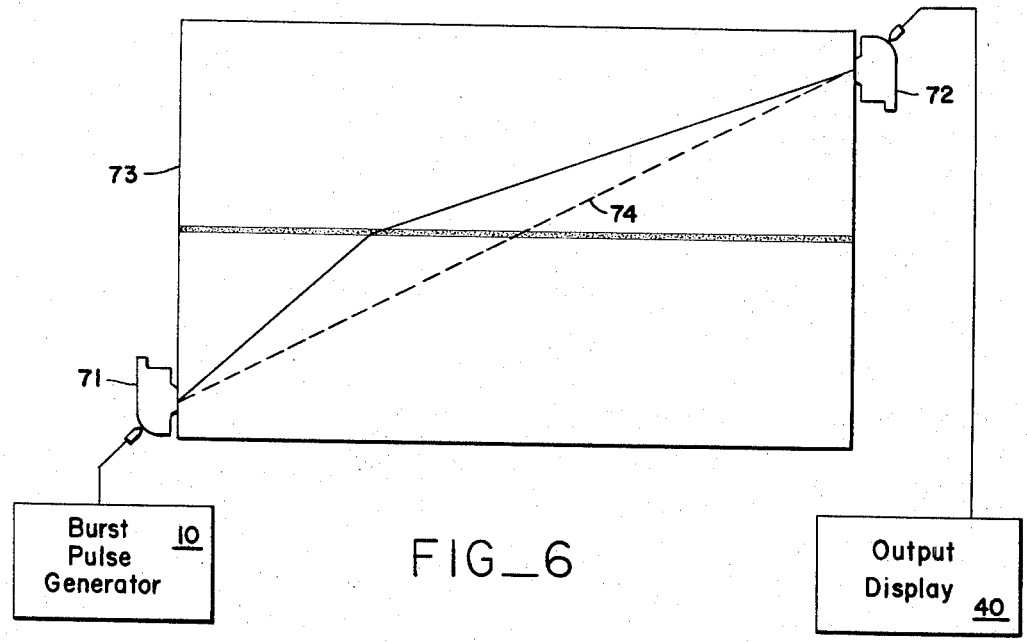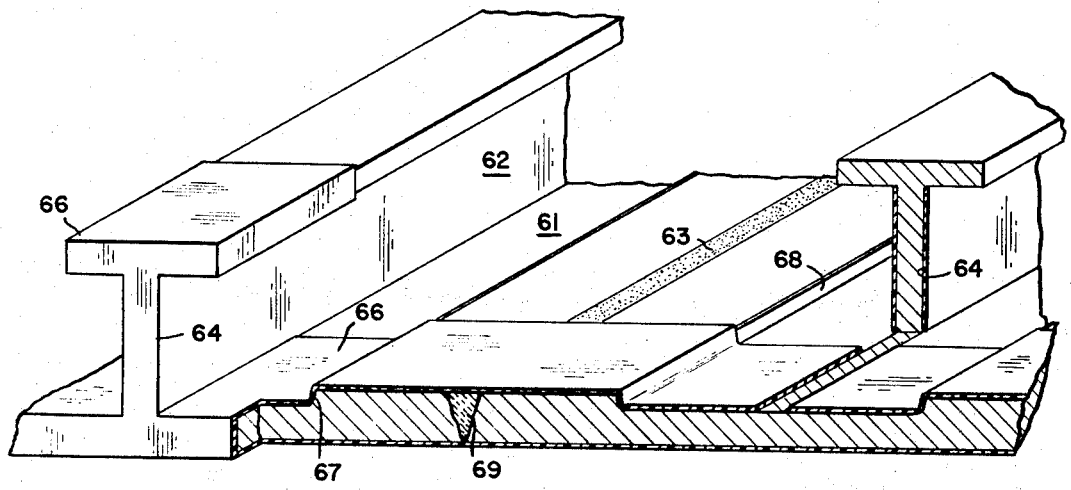

ABSTRACT OF THE DISCLOSURE

Pulses are applied to an object under ultrasonic tests in repeated bursts having multiple pulses per burst. The pulse width, repetition rate, and burst length are tuned to the characteristics of the object to obtain maximum signal passage through the object.

---

This invention relates to a method and apparatus for generating bursts of ultrasonic pulses, and in particular to such method and apparatus for supplying very energetic bursts of pulses to an ultrasonic inspection system.

Heretofore, in ultrasonic testing apparatus, transducers have been energized by single pulses of such intensity as to be within the breakdown voltage of the transducer. In the testing of large objects or objects made of highly attenuating material where the ultrasonic signals generated by the transmit transducer must travel long distances through the object and yet retain sufficient strength to energize a receiving transducer spaced a considerable distance from the transmit transducer, there have been utilized ultrasonic wave trains generated by a single transmitted pulse that has a peak voltage value within the limitations of voltage imposed by the dielectric strength of the transducer. The received wave trains from such a single transmitted pulse are often of such low energy as to be useless. Sine waves can be used to energize such transducers but because of their narrow frequency pass band they couple much less energy into the transducer if it is of low Q. There is, therefore, a need for a new and improved method and apparatus for energizing such transducers.

In general, it is an object of the present invention to provide a method and apparatus for generating bursts of pulses for energizing ultrasonic transducers which will overcome the above named disadvantages.

Another object of the invention is to provide a method and apparatus of the above character in which several parameters of the pulse burst generator can be easily adjusted for maximum received signals.

Another object of the invention is to provide a method and apparatus of the above character in which a broad frequency spectrum is utilized to excite the ultrasonic transducer.

Another object of the invention is to provide a method and apparatus of the above character in which the signal produced is used to excite the object being tested.

Another object of the invention is to provide a method and apparatus of the above character in which band pass frequencies of the test object can be easily determined.

Another object of the invention is to provide a method and apparatus of the above character in which the band pass frequencies are used to determine the desired values of the input signal parameters.

Another object of the invention is to provide a method and apparatus of the above character in which the acoustic spectral characteristics of the test object itself are utilized to tune the signal generator.

Another object of the invention is to provide a method and apparatus of the above character in which the power to the transducer is held to a value within its heat dissipating ability, and the maximum voltage is lower than the breakdown voltage but nevertheless which permits a significant increase in the effective energy transmitted through a test object.

Another object of the invention is to provide a method and apparatus of the above character in which ultrasonic signals received from objects having a complicated shape, or having structural anomalies, can be rectified into simpler ultrasonic components, the complicated parts being acoustically blanked out or acoustically diffused.

Another object of the invention is to provide a method and apparatus of the above character in which the minimum thickness of the object under test can be determined.

These and other objects of the invention will be apparent from the following description in which the preferred embodiment is set forth in detail when taken in conjunction with the accompanying drawings, of which:

FIGURE 1 is a schematic diagram of an ultrasonic testing system and burst pulse generator embodying the present invention.

FIGURES 2A, 2B, 2C, are curves showing the electrical waveforms delivered by various components within the burst pulse generator.

FIGURES 3A, 3B, 3C, are oscillograms illustrating the time based output of the system under test.

FIGURES 4A, 4B, 4C, are oscillograms illustrating the frequency based output of the system under test.

FIGURE 5 is a perspective view, partly broken away and partly in cross-section, of a complicated test object prepared for ultrasonic testing according to the invention.

FIGURE 6 is a schematic view depicting part of a testing system incorporating the present invention.

In general, the present invention consists of a pulse generator or adjustable gating device in which repeated pairs of pulses or other time gated indicators are generated. The pulses or gate signals are used as start-stop trigger pulses to start and stop the generation of a burst of other pulses from a second pulse generator. The bursts of pulses trigger a high power pulse generator or are amplified in a pulse amplifier which supplies high power bursts of pulses to an ultrasonic transmit transducer. The output of the transmit transducer is coupled to the object to be tested to thereby generate ultrasonic waves therein which travel through the object and are received by a receive transducer which transforms them into an electrical signal corresponding to the received ultrasonic signal. This electric signal is processed and analyzed in an output acoustic data processing display system containing time based and frequency based displays and analyzers.

It has been found that when the ultrasonic waves pass through the test object they react with the test object and its boundaries in a manner analogous to electromagnetic wave guides, so that certain frequencies are preferentially passed through the object much more easily than others. The pass frequencies are defined by and at the acoustic wave guide modes of the test object (they contain various combinations of longitudinal and shear waves which effectively cause ellipsoidal motion of the test object particles and are characterized as complex waves). For objects having a thickness of about one inch or less, these acoustic wave guide modes are very selectively defined in the frequency range of interest; while for objects having a thickness greater than one inch, the modes are progressively less well defined.

The invention takes advantage of these acoustic wave guide modes, the pass bands defined by the modes being determined and utilized to define the parameters of the ultrasonic burst of pulses so that very energetic ultrasonic pulses can be sent through the object, yet the power limitations in terms of overheating the transducer are not exceeded.

The acoustic wave guide effects of pulse burst energization is attributed to the following explanation. The burst of ultrasonic pulses in a selected acoustic wave guide mode pass band contains several acoustic modes; in effect, fine structure. Those modes within the pass band, a well as otherwise, are dispersive, i.e., different frequencies have different acoustic group velocities. As the burst of ultrasonic waves moves through the test object, the various dispersive modes move at different group velocities such that pulse broadening occurs. At any particular position or distance from the transmitter, the pulse broadening has the effect of developing several components from several acoustic wave guide modes which, in turn, has the effect of increasing the in-phase received acoustic energy beyond that which it is possible to transmit in a single pulse by acoustical transducers due to their lower breakdown voltage or duty cycle (heating) limits.

To assure that the burst of pulses does not produce different results at different distances from the transmitter, the burst of transmitted pulses must be long enough so that the shift in relative phase angle (in terms of time shift) between the various dispersive acoustic components is shorter than the pulse burst. For example, for a 10 foot acoustic path through the object being tested, the combined received voltage resulting from the receive transducer transforming the received acoustic energy may result from a combination of pulses very early in the burst, whereas at a path length of 50 feet the combined voltage at the receive transducer results from some of the relatively slower components associated with the pulses in the middle of the burst and some of the relatively faster components associated with the pulses towards the end of the burst. To find the proper burst length, the length of the burst is varied to obtain the minimum burst which causes a received signal maximum or saturation. If excessive pulse burst length is used, the net effect will be to actually reduce the received voltage because destructive interference effects occur. In fact, it has been observed that there is a correlation between the minimum test object thickness at any particular acoustic path between a transmitter and receiver, and the transmit burst length required to achieve a maximum combined received signal. This observation results from the saturation of some or all of the acoustic wave guide modes of the test object within some particular acoustic wave guide pass frequency band. By using a standard test block as a reference, the burst length required for saturation can be used to absolutely and reproducibly measure or calibrate the test object minimum thickness directly.

The ultrasonic frequencies used in the invention are in the range of from about 2 to 3 megacycles. Above 3 mc., the ultrasound has a partial wave length approaching the dimensions as the grain boundaries in the material being tested and interacts at the boundaries to make such frequencies less desirable for long distance transmission.

The transmit transducer is of a low Q type cut for a design frequency of longitudinal wave operation of about 2.5 mc. but capable of generating a broad band of energy in the 2–3 mc. band. The pulse shape is adjusted to couple a maximum amount of energy into the transducer. For fast rise time pulses (~200 nanosec.) this condition is found to exist in the neighborhood of a pulse width equal to one-half the period of a sine wave at the desired frequency, and a repetition rate such that the pulses arrive at intervals corresponding to the positive going portions of a train of such sine waves. The latter condition is satisfied for pulse repetition rates approximately equal or subharmonic to the selected frequency. The specific intraburst repetition rate is selected to be that which produces maximum energy through-put in the acoustic wave guide modes of the test object.

Referring to the drawings, the high power ultrasonic pulse generator 10 is shown in FIGURE 1. As shown, it consists of a time gated pulser or trigger 11 which delivers spaced pairs of electrical trigger pulses, each pair providing a start signal and a stop signal. The repetition rate of the pair of pulses can be adjusted by dial 12, and the start-stop time separation can be adjusted by dial 13.

The output of the pulser or trigger 11 is connected to the input of a pulse generator 14 by a coaxial cable 16 so that the pulse generator 14 is turned on by the start signal, and turned off by the stop signal to produce precisely repetitive bursts of pulses. A pulse generator 14 is of conventional design and delivers a series of repeated pulses or signals of fast rise time, and short duration. The intraburst pulse width can be adjusted by dial or control 18; and the intraburst repetition rate by dial or control 19. The output of the generator 14 is connected to the input of a high power pulse amplifier or pulser 21 through coaxial cable 22. The amplifier or pulser 21 is of a conventional type having a capacity to provide output pulses having a voltage of from between 0–2000 volts. A control 24 is provided on the pulse amplifier or high voltage pulses for adjusting the voltage of the output pulses.

The high voltage output from the amplifier or pulser 21 is connected through coaxial cable 25 to a transmit transducer 26 through a variable inductor 27 which co-operates with the transducer 26 to provide a series tuned circuit and to eliminate the capacitive effects of the coaxial cable 25. The transducer is selected from any suitable broad response, low Q type such as types utilizing lead zirconate titanate (PZT) manufactured by Clevite Corporation, or Channel Industries, or lead metaniobate piezoelectric ceramic (LM–278) manufactured by General Electric Co. The low Q transducers are cut for midband operating frequency of 2.5 megacycles and have a response curve which is down at least 3 db at 1.5 and 4 megacycles. Such transducers are tunable to a narrow bandwidth over a broad frequency range when coupled in series or parallel with a variable inductance to form a series or parallel resonant circuit.

As shown in the drawing, the transmit transducer 26 is mechanically (ultrasonically) coupled to a test object 30 at one location thereon by being attached to a wave director 28 which is of a type as disclosed in my copending application Ser. No. 445,503, filed Apr. 5, 1965. However, the manner of coupling the transducer to the test object is not restricted to the use of such a wave director.

The operation of the high power burst pulsed ultrasonic generator shown in FIGURE 1 may now be briefly described as follows. The output of the pulse or time gate generator 11 is shown in FIGURE 2A. As hereinbefore explained, the dial 12 controls the frequency or over-all repetition rate of the bursts of pulses (number of bursts/sec.). It controls the time $\Delta t_1$ shown in FIGURE 2A. The dial 12 is adjusted to a repetition rate of say 100 bursts per second. (It does not control the number of pulses in a burst.) The dial 13 controls the time $\Delta t_2$ between the start pulse 32 and the stop pulse 33 of the output as shown in FIGURE 2A and is adjusted to a value of approximately 1–100 microseconds. This time gate determines the length of the pulse burst and, in turn, for a fixed pulse repetition rate within a burst, the number of pulses in the burst. The output of the pulse generator 14 is shown in FIGURE 2B and consists of burst of pulses 34. Dial 18 controls the width $\Delta t_3$ of each individual pulse within the burst, while dial 19 adjusts the time space $\Delta t_4$ between pulses. (Dial 19 effectively controls the pulse repetition rate within the burst.)

The start pulse or gate signal 32 acts to turn on the pulser 14 and pulses 34, while the stop pulse or gate signal 33 acts to turn off the pulser 14 and pulses 34. The burst of pulses 34 are therefore seen to be adjustable with respect to inter-burst repetition rate, start-stop time, pulse width, and intra-pulse repetition rate. The pulses 34 have a maximum pulse height adequate to drive the pulse amplifier or high voltage pulser 21. The pulse amplifier or high voltage pulser 21 provides a high power, high voltage output adjustable with control 24 to values as high as 2 kv. The pulser amplifier or high voltage pulser 21 provides output pulses 36 which conform to the times $\Delta t_1$, $\Delta t_2$, $\Delta t_3$, and $\Delta t_4$ as defined by the trigger 11 and pulser 14. The pulse amplifier or high voltage pulser 21 and the coaxial transmission line also define the pulse 36 rise time $\Delta t_5$ as indicated in FIGURE 2C.

By way of example, one high power burst pulse ultrasonic generator found to operate very satisfactorily had components of the following types and values:

Pulser or trigger 11—pulser or trigger section of Model 350 RA Velonex High Power Pulse Generator, produced by the Pulse Engineering Corporation.

Pulse generator 14—a Model 123 pulse generator as produced by the E–H Research Laboratories, Oakland, Calif.

Pulse amplifier or high power pulser 21—high power pulse generator section of Velonex Model 350RA.

Transducer 26—WWD Mark V PZT-5 unit, available from the W. W. Dickinson Corporation, San Francisco, Calif.

Inductor 27—Miller 4507.

A burst pulse generator constructed from the above components delivered a wave form similar to that shown in FIGURE 2C.

As shown further in FIGURE 1, the test object 30 is connected to a system output display unit 40 for displaying the character of the received ultrasonic wave trains at the output of the test object. The system output display 40 includes a transducer 41 ultrasonically coupled to the test object 30 at a location spaced apart from the location of the transmit transducer, as by being mounted on a wave director 42 constructed in the same manner as wave director 28. The transducer 41 is connected by coaxial cable through tunable inductor 43 to a preamplifier 43, the output of which is connected to video amplifier 45 for developing an electrical voltage of suitable value and for isolating the test object output from subsequent equipment and power requirements thereof. The output of amplifier 45 is connected through adjustable delay time gate 50 to a time based display including oscilloscope 46 and to a frequency based display including a conventional spectrum analyzer 47. Alternatively, the frequency based display could be formed of a filter network (not shown) adjustable as to band width. An output providing a signal representing the maximum energy at any frequency sensed by the spectrum analyzer is connected to peak reading voltmeter 48 and recorder 49. The time gate 50 is connected by coaxial cable 51 to the output of pulser 11 so that the start-stop signal can be used to start and stop the oscilloscope and spectrum analyzer sweeps at predetermined times, which may be adjusted to occur later than the start and stop of transmission.

Operation of the entire test system as shown in FIGURE 1 may now be briefly described as follows. (The values given are intended to be representative and not limiting.)

(a) Adjust high voltage pulser 21 output amplitude control 24 to say 1 kilovolt and intraburst pulse width control 18 on burst pulser 14 to say 200 nanoseconds. Adjust interburst repetition rate control 12 on pulser 11 to obtain a burst repetition rate of say 1000 bursts per second, and adjust the start-stop time to a low enough value with control 13 to obtain a single pulse output (1 pulse per burst). (For the particular object being tested, be sure that the exponential tail of the received burst does not overlap the pulse train of transmitted signal if the transmit signal is being observed directly on the same oscilloscope. This is accomplished by adjusting the dial 12). The pulser 21 is now putting out single fast rise pulses (1 pulse per burst) independent of the intraburst repetition rate control 19 of pulser 14. Set spectrum analyzer 47 for say 1 megacycle band width about say 2.5 megacycles center frequency. Adjust introburst pulse width with dial 18 on pulser 14 to maximize the received signal. Typical oscilloscope traces observed when the signal has been maximized are shown in FIGURES 3A and 4A, FIGURE 3A showing the voltage vs. time as displayed on the oscilloscope 46, and FIGURE 4A showing intensity vs. frequency as displayed on the spectrum analyzer 47.

As shown in the FIGURE 3A, the transmitted pulse has been displayed directly on the oscilloscope as indicated at 56. At a time (distance) thereafter corresponding to the time required for the ultrasound to travel through the test object, there appears the received electric signal pulse burst 57 corresponding to the ultrasound impinging upon the received transducer. It is noted that the different group velocities associated with different wave guide modes within the test object cause the received pulse 57 to take on a considerably broadened character, there appearing peaks as indicated at 57a–1, 57a–2, and 57a–3. FIGURE 4A is indicative of the type of frequency spectrum as displayed on the spectrum analyzer 47 associated with the pulse 57. As indicated, the energy of the received signal has been largely confined to several pass bands, the largest of which appears at 2.64 megacycles, indicated at 59.

These displays are used to select the particular starting parameters for tuning up the testing system. A selection of these parameters is made by observation of the fact that a principal amount of energy has been permitted to pass through the test object at a particular pass band frequency, in the example shown, the arbitrary value of 2.64 mc. has been used as an example. For simple geometrical shapes of test objects, a particular frequency is selected. This frequency is the optimum frequency because it represents that acoustic pass band for which the object under test represents the lowest attenuation across the test object.

(b) Select the received ultrasonic signal for display on the time base oscilloscope 46 and select a bandwidth of 50 kc. about the selected frequency for display on the spectrum analyzer 47. The transmitted pulses are then turned off; and the receiving system tuned on the noise of the receiver and amplifier. This is done by tuning each of the inductors 27 and 43 for a maximum received signal at the selected frequency. The displays are depicted in FIGURES 3B and 4B. The transmitted pulses are then turned back on.

(c) Starting with the intraburst repetition rate set equal to the center frequency of the selected acoustic wave guide pass band, adjust the repetition rate control 19 on the pulser 14 to maximize the signal. This introburst repetition rate for maximum received signal may differ from the center frequency of the selected frequency pass band because the maximum received signal occurs when the maximum energy in the desired frequency band is contained within the pulse. This energy is derived from the combination of the fundamental frequency plus all harmonics contained in the pulse as defined by its rise time. Since all these frequencies couple electrical energy into the transducer 26 which in varying degree appears as acoustic energy in the desired acoustic wave guide frequency pass band (sine waves constitute a narrow frequency pass band and in general couple less energy into a low Q transducer having a wide frequency pass band than do fast rise pulses which intrinsically have a wide frequency spectrum). Next, tune the intraburst pulse width 18 on burst pulser 14 to maximize the signal, then increase the burst length 13 on gating pulser 11 for maximum received signal voltage. The received signal is depicted in FIGURES 3C and 4C and shows the oscilloscope 46 receiving a series of pulses in the burst. The signals are both considerably larger as a result of the increase in the burst length, also it will be noted that the character of the burst of pulses as received and displayed is not much different from the character of a single pulse. This is due to the fact that the test object acts to integrate the pulses together or broaden the pulses because of their acoustic waveguide interaction with the object as heretofore explained.

The above described selection rules work well for simple objects such as plates and shells. Objects of more complicated nature such as those having discontinuities or attachments thereto exhibit spurious responses due to such elements. Also, the large amounts of transmitted power contemplated by this invention can cause reverberations from such structural anomalies. It is desirable to eliminate such spurious responses from consideration when selecting the pass band. It has been found that for these complicated shapes of test objects, there are techniques that can be used to take advantage of such shapes so that such spurious responses can be easily identified. By way of example, if the complex shape being investigated includes anomalous structural elements attached to an otherwise simple geometrical shape which it is desired to investigate as in the case of stiffeners and weld islands in the structure, the relationship of the pass bands associated with such structural anomalies and the pass bands associated with the main piece under inspection can be separately checked for each pass band frequency by heating different portions of the test object to a temperature difference of about 100° F. and determining the relative effects of such heating by comparing the heating of only a structural anomaly or of only the basic shape which it is desired to inspect. It has been observed that upon such heating there are frequencies displayed on the spectrum analyzer for which there is a least effect when heating the structural anomalies as compared with heating the main piece. The selection of the pass band frequency to be utilized is then made in the same manner as previously described for a simple shape, but those pass bands for which the structural anomalies are principally responsible for, as discovered by the heating test, are avoided. By this method, selective investigation of the test object can be conducted without appreciable interference from such anomalies.

The anomalies mentioned hereinbefore have related to structural material which is of a different character than the portion to be tested, and is attached to that portion or lying therein. Another type of anomaly involves the absence of structure, such as caused by slots, holes, and the like, which may have been formed in the object under test. For that type of anomaly, another technique has been found very successful. This technique makes use of a pressure sensitive tape which has acoustical properties. Therefore in those applications where there are penetrations or variations in the shape of the object being tested, it is desirable to use acoustic taping or masking. The masking off of the anomalies accomplishes the same effect in ultrasonic testing that shielding does for X-ray or gamma ray inspection; that is, it selectively dampens and blanks off undesirable or unneeded test zones.

Masking can be accomplished with many materials but pressure sensitive plastic impregnated cloth tape has been found particularly suitable. The tape should be relatively stiff but sufficiently flexible to conform to the shape of the surface on which it is to be secured. One preferred form of such tape is available from the Minnesota Mining and Manufacturing Company under the designation 3M 390, or from Technical Tapes Inc. as 90–T. Other equivalent forms include synthetic rubber pressure adhesive or plastic impregnated cloth tape. Clothback pressure sensitive tape masks the undesired acoustic radiation in that the pressure sensitive adhesive tends to couple to a metal surface, and damp out surface reactions associated with acoustic wave guide action thereat. The cloth backing provides inertia to damp the horizontal and vertical components of acoustic radiation at the surface. By comparison, paper, cellophane, or polyethylene tapes are significantly less effective because they have inadequate stiffness. Metal backed tape or heavy plastic tapes have adequate stiffness but will not conform to complex surfaces and are therefore exceedingly difficult to use. A polyvinyl chloride (PVC) tape having a thickness from 0.010 to 0.020 inch will work as well as a cloth backed tape but at a higher unit cost. In any case, the tape is used by applying it to the portion to be blanked out, and firmly pressing it thereagainst as by rubbing or rolling the tape onto that portion of the test object so that the tape is in complete intimate contact with the surface of the object. By way of example, for a hole, a piece of tape is merely pressed all about the inside wall and nearby surface defining the hole. Acoustic radiation impinging upon the hole and which would normally be reflected by the wall thereof is, instead, absorbed by the tape, thus avoiding such undesired reflections.

An alternative use of masking is to cover the sides or edges of integral reinforcements, weld islands and the like with tape. The affect here is to damp out those portions of the acoustic radiation which might enter these anomalies, reverbrate therein and cause undesired signals.

By way of example, FIGURE 5 shows part of a test object 60 having a plate with integrally formed stiffeners 62 thereon and weld island 63. The stiffeners are masked with taping 64, the edges with taping 66, and the discontinuity 67 between the weld island and the plate 61 with tape 68. In this way, the weld 69 can be ultrasonically investigated while reducing spurious signal or noise, caused by interaction of the ultrasound with the anomalies, to an acceptably low level.

Another useful masking of ultrasound when placed in contact with metal test objects is a lead strip loaded with steel wool. Such steel-wool-loaded lead can be formed in strips and packed into holes and the like to achieve an intimate contact with the reflective surface. The acoustic losses associated with the lead and the dispersion caused by the steel wool within the lead are effective in combination to absorb ultrasound impinging upon the surface of the test object, and in making an otherwise sharply defined reflective surface into a diffuse zone so that it no longer causes coherent reflection or diffraction of impinging acoustic collimated beams.

For materials having nearly the same characteristic acoustic impedance ($\rho c$) as the test object, the reflections at the interface between the lead steel wool and the test object are nearly eliminated. For example, the characteristic acoustic impedance of lead is very close to that of aluminum so that the reflected waves at a lead-aluminum boundary are nearly eliminated. A similar condition exists for steel although there is a somewhat larger acoustic impedance mismatch between lead and steel.

In another use of the lead/steel wool strips, such strips are placed on corners or sharp edges near a collimated acoustic ray path within a metal object. The steel-wool loaded lead effectively changes a sharp edge which would otherwise be a diffracting edge into a diffuse or non-sharp edge so that diffraction is markedly reduced. This is accomplished by absorption and scattering processes within the steel-wool loaded lead and scattering or diffracting or the rays at an angle oblique to the collimated beam.

Referring now particularly to FIGURE 6, there is shown an arrangement for effecting absolute flaw size calibration of the testing system. As shown, transducers (T, R) are mounted on wave directors 71, 72, symmetrically based upon the corners of a standard test object 73 so that acoustic radiation can be sent through it diagonally on paths 74. It will be noted that the following materials are traversed in series as the ultrasound passes from the transmit transducer to the receive transducer:

(1) Transmit transducer facing material.
(2) Contact compound between the transducer and wave director.
(3) Wave director.
(4) Wave director facing material at point of contact of test object and contact shim, if any.
(5) Test object as affected by its thickness, composition, surface conditions, cross sectional shape, heat treatment and length.

(6) Items 2 through 4 in reverse order.
(7) Receiver transducer facing material.

The net integrated effect of all these components traversed by a burst of acoustic radiation and received by the acoustic data processing system is a voltage which can be measured on the oscilloscope 46. Assume a voltage of say 3 volts is measured on the oscilloscope 46. Using a flaw F in the weld of the standard test object, the acoustic scattering cross section indicated by the voltmeter 48 can be calibrated absolutely—square inches or square centimeters. Thereafter, for any other test object of different size, shape, material and metallurgy, if the wave directors are similarly set up and the pulse burst length is varied to get an oscilloscope reading of 3 volts, the flaws in welds approximately placed the same as those in the original test object will be indicated in absolute terms, i.e., in dimensions of area.

The tested region or weld does not have to be exactly in the same placement in the unknown object as in the original standard test object because in most plate or tubular objects of steel or aluminum the attenuation effect of 1–2 feet difference in position is usually not significant and can be safely ignored. Nevertheless, if the selective placement of the weld or test zone within the unknown test object is markedly different from what it was in the original test object, the cross section reading as indicated on the voltmeter 48 can be adjusted by multiplying the reading by the ratio of (a) the average distance to the test zone in the test object to (b) the average distance to a zone geometrically similarly placed in the original standard test object upon which the calibration was based. The process of bringing the over-all system response to a previously determined standard level (in this case 3 volts) integrates all the factors previously cited, 1–7, plus all electronic variables such as amplifier changes, transducer changes, etc., thereby eliminating the need for continual recalibration against the standard. In this way, the testing system can be readily reset to a standard reference level without complete recalibration against a standard test object before each use.

I claim:

1. In an ultrasonic signal generator, means for generating an electrical start signal and an electrical stop signal to define a burst length, means for varying the repetition rate of the start signal and stop signal to thereby define a burst repetition rate, pulser means operatively connected to said start and stop signal generating means for generating electrical pulses upon receipt of the start signal and for stopping generation of such pulses upon receiving the stop signal, said last named means having means for varying the pulse repetition rate and pulse width of each of the pulses generated, means operatively connected to said pulser means for generating high power electrical pulses having a pulse width and repetition rate the same as the pulses received and having a fast rise time to thereby provide output pulses having energy dispersed through a wide frequency spectrum, and an ultrasonic transducer coupled to said last named means, said transducer capable of converting the electrical pulses received into commensurate ultrasonic signals.

2. An ultrasonic wave generator as in claim 1 in which said transducer is coupled to said last named means through an inductor to form therewith a series resonant circuit.

3. An ultrasonic wave generator as in claim 1 in which said pulses have a shape such that a large amount of energy of the pulses lies in the 2–3 megacycle band.

4. In apparatus for determining flaw locations and sizes in an object under test, first and second ultrasonic transducers connected at spaced locations on the object, an ultrasonic wave generator operatively connected to one transducer and serving to supply an ultrasonic signal to the object, the signal comprising bursts of pulses repeated at regular intervals, said pulses having variable pulse width and repetition rate, and visual means for generating and displaying time based and frequency based data, said display means operatively connected to the other transducer and serving to receive ultrasonic waves that have traveled through the object and analyze such waves to indicate when a maximum amount of energy in the received signal has been found, said ultrasonic wave generator further including means for adjusting the width and repetition rate of the pulses during operation to thereby permit the pulse width and repetition rate of the pulses to be adjusted until a maximum transmission of energy is indicated.

5. Apparatus as in claim 4 in which the test object has structural anomaly and means for acoustically blanking off said anomaly so that it does not coherently reflect or deffract ultrasound.

6. Apparatus as in claim 5 in which said means comprises a pressure sensitive cloth tape having a heavy but comformable backing, said tape being applied to the surface of said anomalies.

7. Apparatus as in claim 5 in which said means is made of lead loaded with steel wool.

8. In a method for optimizing an ultrasonic test of an object in which a low Q transducer converts electrical signals into ultrasonic signals which are passed through the object to be tested, the steps of applying single fast rise time ultrasonic pulses to the object to generate a broad band of ultrasound in the object, receiving ultrasound that has passed through the object, varying the pulse width of said pulses until a band pass frequency is noted, at which the maximum energy has passed through the test object, thereafter applying repeated bursts of pulses to the transmit transducer, said bursts having a maximum intensity and burst repetition rate within the duty cycle limitations of the transducer, the pulses within each burst having a pulse width of about one-half cycle of the said pass band frequency, and a repetition rate integrally related to the said frequency.

9. A method as in claim 8 in which the pulse width is approximately 200 nanoseconds, and in which the pulse rise time is less than 80 nanoseconds.

10. A method as in claim 8 in which the pulse repetition rate is about the selected pass band frequency.

11. A method as in claim 8 in which the repetition rate is about a subharmonic of the selected pass band frequency.

12. In a method for optimizing the power transmission through an object under ultrasonic test, the steps of transmitting single fast rise time ultrasonic pulses into the object, said pulses being repeated in bursts of one pulse, receiving ultrasound that have passed through the object, varying the pulse width of said transmitted pulses until the received ultrasound amplitude reaches a maximum value for some particular frequency, increasing the number of pulses per burst at a repetition rate corresponding to the particular frequency, so that said pulses will have a significant frequency component at about said frequency, varying the pulse repetition rate until a maximum received signal is reached.

13. In a method as in claim 12 further including the step of returning the pulse width for a maximum received signal after the pulse repetition rate is varied.

14. A method as in claim 12 further including the step of increasing the burst length until a maximum received signal is obtained.

15. A method for optimizing power transmission through a metal object under ultrasonic test, the steps of applying high voltage fast rise time ultrasonic pulses from a transducer to said object at one location, said pulses having an initial pulse width of about 200 nanoseconds and a repetition rate of about 100 per second, receiving ultrasound from the object at a location ultrasonically spaced from said one location, adjusting the width of said pulses until a maximum in the received signal is noted at some particular frequency, stopping the sending of said pulses and adjusting the transmit receive system for maximum noise through said object at said particular frequency, again applying bursts of pulses to said transducer beginning with a pulse repetition rate per burst corresponding to said particular frequency, adjusting said pulse repetition rate about said frequency to obtain a maximum received signal, readjusting said pulse width for a maximum received signal and adjusting the burst length to a maximum signal within the duty cycle limitations of said transducer.

16. A method for determining the thickness of plate-like material comprising the steps of introducing repeated bursts of ultrasonic pulses into said material to pass therethrough, receiving pulses from the material at a location ultrasonically spaced from the location of introduction of the ultrasonic pulses, varying the burst length of said pulses between short times to longer times until a maximum in the received signal is noted, and comparing the value of the noted burst length with that obtained from a reference test block of known thickness to determine the thickness of the material under test.

References Cited

UNITED STATES PATENTS

| | | | |
|---|---|---|---|
| 3,120,120 | 2/1964 | Worlton et al. | 73—67.5 |
| 3,237,445 | 3/1966 | Wood | 73—67.5 |
| 3,276,249 | 10/1966 | King | 73—67.8 |

RICHARD C. QUEISSER, *Primary Examiner.*

JOHN P. BEAUCHAMP, Jr., *Assistant Examiner.*